(No Model.)
A. J. B. BERGER.
CAR FENDER.
No. 526,851. Patented Oct. 2, 1894.
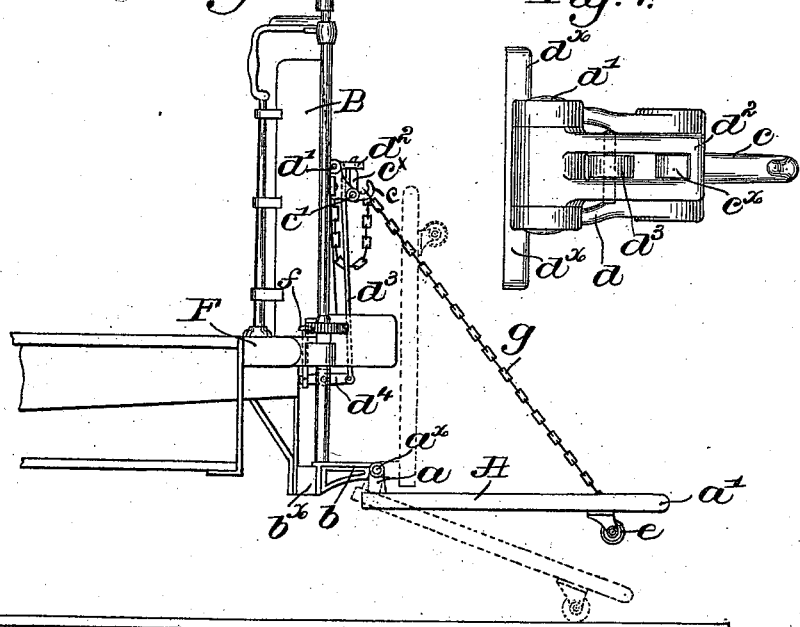
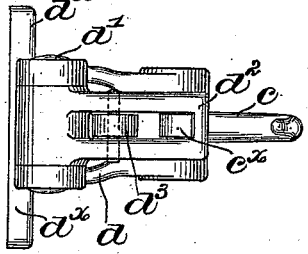
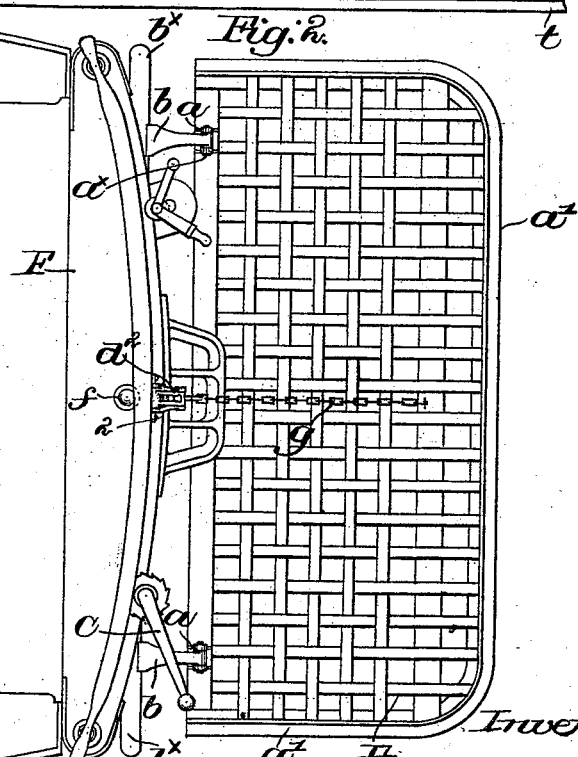
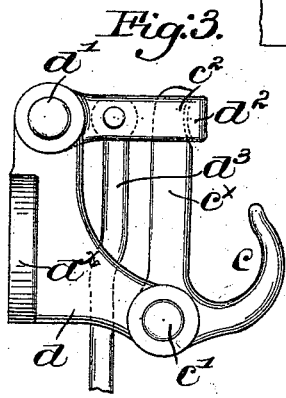
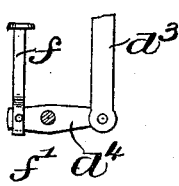
Witnesses:
Louis W. Lowell
Thomas J. Drummond
Inventor:
Ambrose J. B. Berger.
By Crosby & Gregory
Attys

UNITED STATES PATENT OFFICE.

AMBROSE J. B. BERGER, OF HINGHAM, MASSACHUSETTS, ASSIGNOR TO THE STEEL CABLE ENGINEERING COMPANY, OF MAINE.

CAR-FENDER.

SPECIFICATION forming part of Letters Patent No. 526,851, dated October 2, 1894.

Application filed November 15, 1893. Serial No. 490,975. (No model.)

*To all whom it may concern:*

Be it known that I, AMBROSE J. B. BERGER, of Hingham, county of Plymouth, State of Massachusetts, have invented an Improvement in Car-Fenders, of which the following description, in connection with the accompanying drawings, is a specification, like letters and figures on the drawings representing like parts.

Many forms of fenders have been devised for electric street cars, with the object of lessening the danger to the life of pedestrians, the devices having more or less merit, but the great objection to their adoption by the street car companies is their cost, and the fact that they are not so decidedly efficient and rapid in their operation as to justify the expense of installation.

A very common form of fender consists of a platform of slatted iron in a strong metallic frame, the platform projecting in front of the car some distance above the track, and adapted to be pushed in under the car when not in use. Such a fender is objectionable on account of its height above the track, for if an obstruction, human or otherwise, can pass under the platform it is perfectly useless.

This invention has for its object the production of a fender which will be free from the foregoing objections, and which can, with very slight expense, be applied to the fender particularly referred to, to make the same efficient and rapid in operation.

In accordance therewith my invention in car fenders consists of a platform pivoted to the car and normally held above the track, combined with a hooked dog pivoted above said platform, a flexible sustaining connection secured to the platform and adapted to be engaged by the hook of said dog, a latch to normally engage said dog, a removable pin depressible in the car floor, and connections between it and the latch, depression of said pin tripping the latch and thereby permitting the dog to turn upon its pivot and disengage its hook from said platform connection, substantially as will be described.

Other features of my invention will be hereinafter described and particularly pointed out in the claims.

Figure 1 in side elevation represents a sufficient portion of a car to be understood, with my invention applied thereto. Fig. 2 is a plan view thereof. Figs. 3 and 4 are enlarged elevation and plan views, respectively, of the locking and tripping mechanism, to be described.

I have herein shown my invention as applied to an electric car of any desired construction, having the usual extended platform floor F and dash-board B secured thereto, brake handle C, and motor controlling apparatus D, the same forming no part of my invention.

Instead of securing supporting guides for a sliding fender platform to the cross brace $b^x$, attached to the car by suitable brackets, I secure rigidly thereto one part, as $b$, of a hinge or joint, the other part $a$ thereof being secured to or forming a part of the platform A, which may be of usual construction, but preferably having a flexible buffer $a'$ secured thereto.

The parts of the hinges or joints are connected by pintles $a^x$, which form the pivots of the platform A, which latter may assume the full line position shown in Fig. 1, or either of the dotted line positions shown therein, according to circumstances.

Secured to the dashboard B, preferably at the center thereof, and at a suitable height above the platform A, is the operative mechanism for holding the said platform above the track, and herein shown as consisting of a dog having a hook $c$ and upturned shank $c^x$, pivoted at the base of said hook and shank at $c'$ in suitable bearings formed in a casting $d$, provided with lateral ears $d^x$ by which it is attached to the dashboard by suitable bolts 2. (See Fig. 2.) A loop-like latch is pivoted at $d'$ to said casting, and adapted to engage the shank $c^x$, and maintain the dog in the position shown in the drawings, the outer face of the shank at its upper end being concaved at $c^2$, (see Fig. 3) to receive more securely the latch and prevent accidental displacement thereof.

A flexible sustaining connection $g$, herein shown as a chain, is secured at one end to the platform A and at the other end to the dashboard, of sufficient length to hang slack when the platform is in operative position, so as to offer no obstacle to a person falling on the fender. This chain or connection is adapted to be engaged by the hook $c$ of the dog when the latter is locked, to sustain the platform in full line or intermediate position, Figs. 1 and 2, or to hold the platform upright against the dashboard in inoperative position, see dotted lines Fig. 1, when the car is going in the opposite direction.

It will be noticed that in intermediate position the platform A projects in front of the car a short distance above the track $t$, in substantially the position of the sliding fenders hereinbefore referred to, and remains in such position ordinarily. Should, however, the track be suddenly obstructed, as by a person, the latch $d^2$ is instantly tripped by the motorman and the weight of the platform immediately turns the dog upon its pivot $c'$ to disengage the hook $c$ and sustaining connection $g$, whereupon the platform falls into operative position, with its forward edge just above the track, and supported upon suitable rolls or wheels $e$, which may be covered with rubber if desired.

The tripping of the latch is accomplished by the foot of the motorman, depressing a pin $f$, extended through the car floor and bifurcated at $f'$ to straddle one end of a lever $d^4$, pivotally supported beneath the floor, the other end of the lever being connected by a link $d^3$ to the latch $d^2$, the pin, lever and link constituting tripping mechanism. As the pin $f$ is depressed the outer end of the lever $d^4$ is elevated, raising the latch from engagement with and releasing the shank $c^x$ of the dog. The movement of the dog on its pivot $c'$ when so released is instantaneous, and its disengagement with the connection $g$, and the fall of the platform, follow each other so rapidly as to appear simultaneous with the depression of the pin $f$.

The lower end of the pin is slotted or bifurcated at $f'$, to rest upon the lever $d^4$, the pin being guided by the opening therefor in the car floor, so that when a car arrives at the end of the route the motor man, after lifting the platform A and securing it against the dash-board, as shown by dotted lines Fig. 1, removes the pin $f$ and takes it with him to the other end of the car, which is equipped similarly to the end shown, and drops the pin into the hole and onto the lever. By this arrangement accidental or unwarranted interference with the fender is practically obviated, for the weight of the fender platform is sufficient to render the release of the latch $d^2$ by the fingers difficult.

I preferably secure one of the rolls or wheels $e$ at each side of the platform A in such position that they will rest upon the track $t$ when the platform is in operative position, and if desired one or more similar wheels may be secured to the center of the platform, to rest upon the road bed when the car is rounding sharp curves which would throw one or both of the side wheels $e$ from the track.

The interior of the platform frame may be filled in with slatted or lattice iron work, as shown, or strong canvas, netting, &c., as may be desired, and the buffer $a'$ may be conveniently formed of rubber tubing.

I claim—

1. A car fender consisting of a platform pivoted to the car and normally held above the track, combined with a hooked dog pivoted above said platform, a flexible sustaining connection secured to the platform and adapted to be engaged by the hook of said dog, a latch to normally engage said dog, a removable pin depressible in the car floor, and connections between it and the latch, depression of said pin tripping the latch and thereby permitting the dog to turn upon its pivot and disengage its hook from said platform connection, substantially as described.

2. A car fender consisting of a platform pivoted to the car, and a sustaining chain connected to said platform, combined with a dog having a hook to engage said chain and an upturned shank, and pivoted at the base of the hook, a latch to engage the shank and hold said dog in operative position, and means to trip said latch to release the shank, whereby the weight of the platform turns the dog upon its pivot to disengage the hook and sustaining chain, substantially as described.

3. A car fender consisting of a platform pivoted to the car, and a flexible sustaining connection for the platform, combined with a hooked dog pivoted above the platform to engage the connection and maintain the platform in position above the track, a latch for the dog, a pivoted lever, a link connecting it and the latch, and a removable pin adapted to extend through the car floor and rest upon said lever, depression of said pin turning the lever and releasing said latch, whereby the dog is turned to disengage the connection and permit the platform to drop into operative position, substantially as described.

In testimony whereof I have signed my name to this specification in the presence of two subscribing witnesses.

AMBROSE J. B. BERGER.

Witnesses:
JOHN C. EDWARDS,
FREDERICK L. EMERY.